United States Patent [19]

Murakami et al.

[11] 4,268,753
[45] May 19, 1981

[54] LEVEL DETECTION DEVICE FOR ENCLOSED TANKS

[75] Inventors: Eugene T. Murakami, Diamond Bar; Thomas A. Gray, Anaheim, both of Calif.

[73] Assignee: Thomas Gray & Associates, Inc., Division Level Link, Orange, Calif.

[21] Appl. No.: 75,014

[22] Filed: Sep. 13, 1979

[51] Int. Cl.³ .............................................. G01F 23/00
[52] U.S. Cl. .................................................. 250/357
[58] Field of Search ............... 250/357, 308, 272, 273, 250/428, 432 R

[56] References Cited

U.S. PATENT DOCUMENTS

| | | | |
|---|---|---|---|
| 2,323,128 | 6/1943 | Hare | 250/357 |
| 2,348,810 | 5/1944 | Hare . | |
| 2,378,219 | 6/1945 | Hare | 250/357 |
| 2,675,478 | 4/1954 | Brunton et al. . | |
| 2,714,167 | 7/1955 | Herzog | 250/357 |
| 3,553,636 | 1/1971 | Baird . | |

Primary Examiner—Davis L. Willis
Attorney, Agent, or Firm—Knobbe, Martens, Olson, Hubbard & Bear

[57] ABSTRACT

A level detection system utilizing backscattered radiation in which a radiation source is vertically arranged between two radiation detectors along the exterior of a tank, the system automatically moving up or down along the height of the tank in response to radiation received by the detectors to indicate the level of material within the tank. Variations in wall thickness of the tank are automatically compensated for by comparing the electronic signals produced by the two detectors and using the differential signal to drive the system.

15 Claims, 9 Drawing Figures

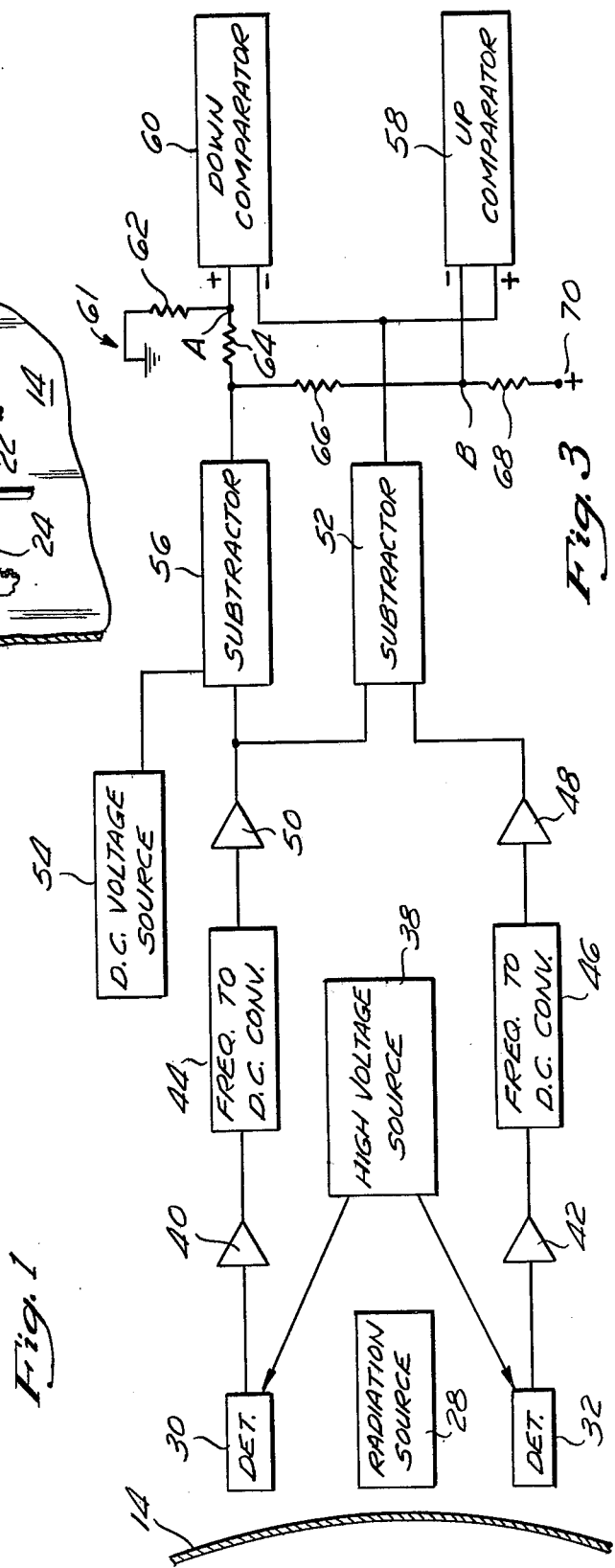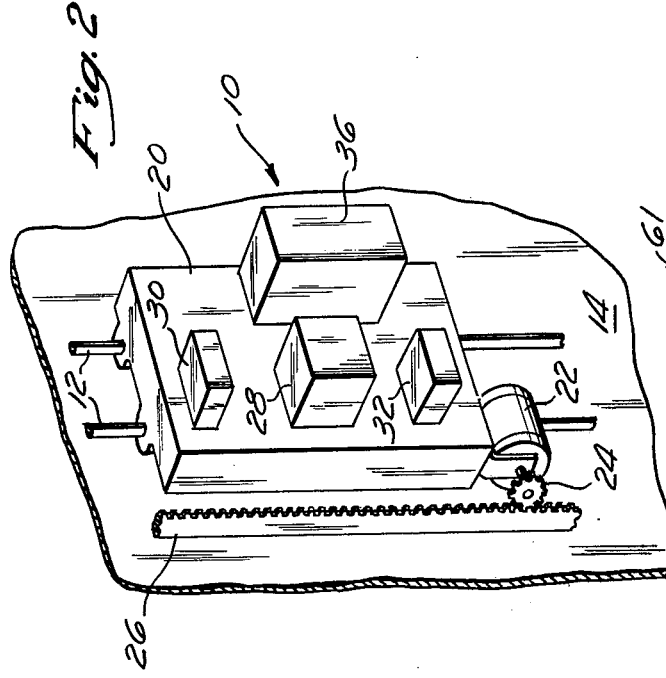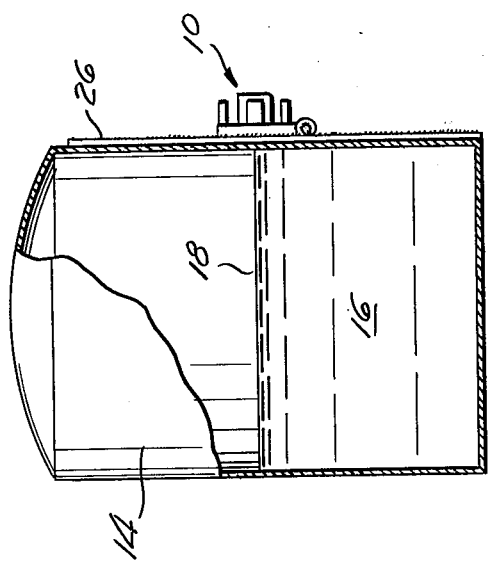

LEVEL DETECTION DEVICE FOR ENCLOSED TANKS

BACKGROUND OF THE INVENTION

The present invention relates to a device for detecting the level of material within an enclosed tank, and, more particularly, to a backscattered radiation system which accurately and automatically determines such level while compensating for variations in the thickness of the walls of the tank.

It is often necessary to measure the level of material within a tank into which entry is impossible. For example, entry may be prohibited, for sanitation reasons, into tanks containing food products. Also, where tanks contain materials under extreme pressure such as liquid propane gas, or at extreme temperature, such as cryogenic liquids, the level of such materials within the tank must be measured from the exterior.

In the past, radiation detection systems have been utilized to measure the level of such materials within enclosed tanks. One such system is a direct radiation system in which a radiation source is placed near the vertical wall of the tank so that it emits gamma radiation into the tank. A radiation detector is placed along the opposite vertical wall of the tank so that radiation from the source passes through one wall of the tank, into the interior of the tank, through the opposite wall of the tank, and is detected by the detector on the opposite side.

Under a direct radiation system, if there is material within the tank at the level at which the source and detector are placed, the amount of radiation sensed by the detector will be less due to radiation absorption by the material. If there is no material in the tank at that level, the amount of radiation detected will be higher, since it will not be absorbed in its travel through the tank. Therefore, the system can be used to determine whether the level of material within the tank is above or below a fixed source and detector. Thus, as the material level in the tank changes, the amount of radiation sensed by the detector will increase or decrease sharply as the upper level of the material passes the source/detector level.

In some direct radiation systems, a single source and detector are moved together along opposite vertical walls of the tank on a pair of pulleys or tracks; however, it is also common for several sources and detectors to be fixed at certain locations along the height of the tank, or to mount elongated or strip sources and detectors in opposing positions along the height of the tank. With all these varieties of direct radiation systems, it is possible to determine the level of material within a tank by noting changes in the amount of radiation detected along the vertical dimension of the tank.

However, the accuracy of all such direct radiation systems is limited by the diameter of the tank. That is, if the system is installed on a very wide tank, the amount of radiation from a usable source may be so low that a reliable measurement is impossible at the opposite wall. The level of radiation may not be increased to overcome this difficulty in many situations, since such increase requires an expensive and very large source assembly.

Another type of level detection system utilizes a backscattered radiation concept in which the radiation source and detector are mounted together on the same side of the tank. In such a system, the source is highly directive and emits radiation only through the wall of the tank and into the interior, where it is backscattered by material within, passes out again through the same wall of the tank, and is detected by a radiation detector mounted adjacent to the source. Thus, if there is material in the tank at the location where the source/detector unit is located, the amount of radiation sensed by the detector is high. However, if there is no material in the tank at that location, the detector will sense a very low amount of radiation since very little is backscattered.

The level of material within the tank can be determined by moving such a backscattered radiation unit up and down along the vertical wall of the tank and noting where an abrupt change in the amount of radiation detected occurs. This backscattered-type detection system solves the problem presented in the direct radiation system; that is, it is not affected by the width of the tank. However, this system does not address a problem which is common to both the direct and the backscattered radiation systems: variations along the vertical dimension of the tank in wall thickness, wall density or other physical properties of the material from which the wall is constructed.

The thickness of the walls of many tanks varies along their height. This is a serious problem in level detection systems which utilize radiation principals, since a thicker tank wall backscatters greater radiation levels and allows less radiation to pass. For example, in a direct radiation system, a very low radiation reading at a certain point may be due to the thickness of the walls of the tank, rather than the presence of material within the tank. An operator of the system may mistake the low radiation reading as indicating that the source/detector pair is at a location below the level of the material, while in actuality, the pair is at a point above the level of the material in the tank.

Similarly, in a backscattered radiation system, a low radiation reading may be due to the thickness of the tank wall rather than the absence of material within the tank. Thus, the system may be at a point at or below the level of material within the tank, but a low radiation reading caused by a thick wall may be mistaken for the absence of material. The adverse effects caused by variations in wall thickness may equally be present due to variations in wall density or other irregularities in the physical properties of the wall.

Therefore, a serious shortcoming of both direct and backscattered radiation level detection systems is that they fail to compensate for wall variations along the height of the tank. This shortcoming greatly effects the accuracy of such systems.

The present invention offers a simple, yet unique solution to this problem by eliminating the adverse effects due to variations in wall thickness or other wall properties of the tank.

SUMMARY OF THE INVENTION

The present invention utilizes a backscattered radiation concept which automatically compensates for variations in wall thickness or other wall parameters along the height of the tank. Thus, the present system eliminates inaccuracies in level detection which are due to the diameter of the tank and changes in wall thickness, as well as density or material variations along the tank's linear dimension.

A radiation source is mounted on one side of the tank between two radiation detectors, one detector being located above the source and one below. The radiation source is highly directional to prohibit direct radiation to the sensors while focusing it so that it passes into the tank. The upper detector is directive also, and is positioned so that it will sense radiation backscattered from regions just below the source, while the lower detector is directive and positioned so that it will receive backscattered radiation from regions just above the source. These two detectors are electronically connected with each other and with an electric motor, and all of these components are mounted together as a single unit on a track running vertically along the height of the tank. The level of material within the tank is determined by the position of this level detection unit. That is, the system is automatically driven up or down along the track by the motor in response to radiation sensed by the detectors, and the system is stationary when it is located adjacent the level of the material within the tank.

As the source emits radiation into the tank, it is backscattered and sensed by the two detectors. However, the electronic signals produced by each of these detectors are electronically compared by subtracting one from the other. The resulting signal is fed into each of two electronic comparators, one of which causes the electric motor of the system to drive the unit up the tank wall and the other which causes it to drive the unit down the tank wall. The signal produced by one of the detectors is substracted from a constant signal, and the resulting difference is used as a reference voltage which is supplied to each of the comparators.

As an example of the operation of the present invention, if the level detection system is above the level of material within the tank, the signal produced by each of the detectors will be weak since very little radiation will be backscattered to them. The electronic signals produced by the two detectors are subtracted from one another and supplied to the comparators, along with the reference voltage produced from the signal detector. These signals cause the "down" comparator to energize the motor, and the unit is driven downward towards the level of material in the tank. Similarly, if the unit is below the level of material, the "up" comparator will be activated and cause the motor to drive the unit upwards along the tank wall. Finally, when the upper detector is above the level of material and the lower detector is below the level of material, neither comparator will be activated and the unit will remain stationary, thus indicating the level of the material in the tank. The existence of a voltage divider network in the electronic circuitry creates a finite dead zone or hysteresis within which the system is at rest, driven neither up nor down. This tends to eliminate system hunting or oscillation about the material level.

An important advantage of the present invention is that the subtraction of the electronic signals produced by the two detectors eliminates the effect of wall variations along the height of the tank. For example, if the unit is located in a region where the wall of the tank is thick, both detectors will produce weaker signals in response to backscattered radiation than in a region where the wall is thinner. However, assuming for a moment that the tank is empty, the subtraction of the two signals will produce a net signal which is equal for both locations. This is due to the fact that both detectors are receiving radiation through a wall having a single thickness at any given time. Therefore, the only difference in the net signal produced by the system between a location where the wall is thick and one where the wall is thin is due to the presence of material in the tank. This feature allows the level detection system of the present invention to yield accurate results regardless of variation in wall thickness or other wall properties.

The present invention also corrects the reference voltage produced by a signal detector to compensate for variations in wall thickness, and provides for a stable system in which the source/detector unit will remain stationary within a narrow range of the actual level of material in the tank, rather than oscillating in response to minute changes in the level or to mechanical inefficiencies in the motor.

DESCRIPTION OF THE DRAWINGS

These and other advantages of the present invention are apparent by reference to the drawings in which:

FIG. 1 is a schematic sectional view of the level detection system of the present invention shown adjacent to a tank which is broken away to reveal the level of material within;

FIG. 2 is a perspective view showing the individual components of the present invention;

FIG. 3 is a schematic block diagram of the electronic circuitry associated with the two detectors illustrating the manner in which the signal produced by one is compared to the signal produced by the other;

FIG. 4a is a graph of the voltage levels produced by two of the amplifiers of FIG. 3 versus the position of the level detection system relative the level of material in the tank;

FIG. 4b is a graph of the voltage levels of the two subtractors of FIG. 3 versus the position of the system;

FIG. 4c is a graph of the voltage levels of the two comparators of FIG. 3 versus the position of the system;

DETAILED DESCRIPTION OF THE PREFERRED EMBODIMENT

Figure 4:
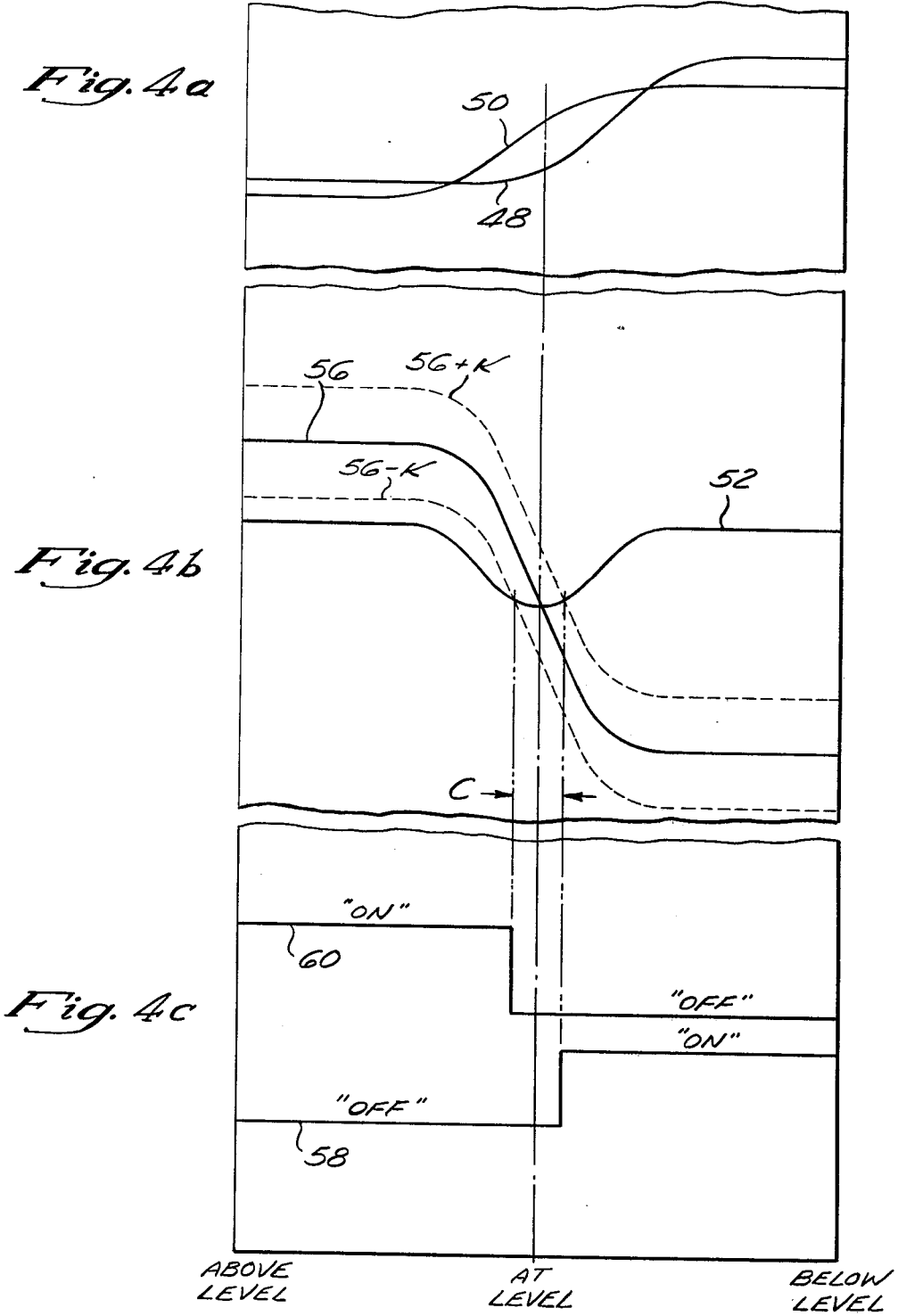
FIG. 4 shows a series of signal level graphs for the circuit of FIG. 3, as follows.

Referring to FIGS. 1 and 2, a level detection system 10 of the present invention is shown mounted on a track 12 running vertically along the wall of a tank 14. The wall of the tank 14 is cut away to show an upper level 18 of a material 16 contained within the tank 14. When the system is operating, the level 18 of the material 16 within the tank 14 is indicated by the position of the detection system 10 on the outside of the tank 14. Thus, the level 18 may either be observed visually by noting the position of the system 10, or this position may be monitored electronically by sensors (not shown) on the track 12.

FIG. 2 depicts in more detail the individual components of the present level detection system 10. The detection system 10 is mounted on a large movable base or panel 20 which is, in turn, mounted on the tracks 12 running along the wall of the tank 14. The entire system 10 is driven upward or downward by an electric motor 22 having a pinion 24 in communication with a rack 26 arranged parallel to the tracks 12.

A gamma radiation source 28 is mounted on the panel 20 between two independent Geiger Mueller radiation detectors 30 and 32. The source 28, as is well known in the art, contains radioactive material, and includes a shield which permits gamma radiation to exit the source 28 only in a narrow beam directed into the panel 20 and tank 14 wall. The upper detector 30 is positioned above source 28, but is also shielded to provide substantial directivity. Thus, the upper detector 30 senses radiation backscattered only from regions within the tank which are below the source 28. In a similar manner, lower detector 32 senses radiation backscattered only from regions above the source 28. Both detectors 30,32 are shielded from direct radiation emitted from the source 28 so that the radiation passes directly into the tank 14. The source 28 is positioned so that it will emit gamma rays which will be equally backscattered to each detector 30,32, if the material within the tank is uniform. An electronic system 36 is connected to the detectors 30 and 32 and the motor 22, so that the detection system 10 is automatically driven upward or downward along the wall of the tank 14 in response to radiation sensed by the detectors 30,32.

For example, if the system 10 is above the level 18 of the material 16 within the tank 14, the motor 22 will cause the system 10 to be driven downward, while the opposite will occur if the system 10 is below the level 18 of the material 16 in the tank 14. When the upper detector 30 is above the level 18 of material 16 in the tank 14 and the lower detector 32 is below the level 18, as shown in FIG. 1, the system 10 will remain stationary. Thus, the level 18 of the material 16 in the tank 14 can be determined by merely viewing the vertical position of the system 10. If the level 18 of the material 16 changes, the system 10 will automatically be driven up or down until the level 18 once again is located.

FIG. 3 depicts, in block diagram form, the electronic circuitry which is utilized in the present invention to drive the detection system 10 up or down along the tank 14 wall. Detectors 30 and 32 are supplied with a high voltage by a power source 38 to enable them to generate electric pulses in response to incident radiation. The output signals of upper detector 30 and lower detector 32 are typically in the form of pulses, the frequency of which indicates the received radiation level. These pulse signals are amplified by amplifiers 40 and 42, respectively, and converted to DC current by frequency-to-voltage converters 44 and 46, and then amplified once again by amplifiers 50 and 48, respectively. The gain of amplifier 48 is greater than that of amplifier 50, and in the preferred embodiment, these gains are approximately three and two, respectively.

FIG. 4a depicts the relative values of the voltages produced by amplifiers 48 and 50 as the level detection system travels along the height of the tank. If the system is above the level of material in the tank, detectors 30 and 32 will sense approximately equal amounts of backscattered radiation; however, as shown in FIG. 4a, the signal of amplifier 48 will be slightly greater than that of amplifier 50 because of its higher gain. After the system travels below level, the signals from amplifiers 48 and 50 are both increased equally, as shown in FIG. 4a, since detectors 30 and 32 are sensing equal, increased amounts of backscattered radiation due to the presence of material adjacent their location.

Referring again to FIG. 3, the signal output of amplifiers 50 and 48 are compared in a subtractor 52. It is the subtraction of these two signals that allows the level detection system 10 of the present invention to compensate for variations in wall thickness of the tank 14. Assuming that the tank is empty, the output signal of the subtractor 52 is the same for a location in which the wall is thick as it is for a location in which the wall is thin, since both detectors 30, 32 are sensing radiation through the wall at approximately the same location, and the contribution of wall thickness to the signals from detectors 30 and 32 is equal and cancels at the subtractor 52. Thus, the present system is sensitive only to the absence or presence of material within the tank.

The signal from subtractor 52 changes only when one detector is above the material and the other is below. This is because, when both detectors 30, 32 are above or below the level of material, the effect on their output caused by the absence or presence of material tends to cancel in the same manner, just described, as variations in wall thickness. This feature of the present invention is illustrated in FIG. 4b which depicts the voltage levels of subtractors 52, 56 when the system is at various levels along the tank. It will be noted that the signal from subtractor 52 is identical when the system is both above or below level, changing only as the system approaches the level of material.

Referring again to FIG. 3, the signal from the subtractor 52 is connected to the negative input terminal of a down comparator 60 and the positive input terminal of an up comparator 58. These comparators 58, 60 compare the voltage levels being fed into their positive and negative terminals. If the voltage level in the positive terminal is higher, by any amount, than the voltage level in the negative terminal, that particular comparator 58, 60 will provide a signal used to drive the system in the appropriate direction toward the level of material.

Therefore, it is necessary for the comparators 58, 60 of the present invention to compare the signal from subtractor 52 with some reference signal. In the preferred embodiment of the present invention, this reference signal is provided by upper detector 30. In order to insure that this reference signal will be the same as that from subtractor 52 when the system is at level and to prevent comparators 58, 60 from allowing the system to be driven up or down at such time, the signal from amplifier 50 is subtracted from a variable DC voltage source 54. The voltage level of source 54 can be adjusted so that the signal from subtractor 56 is both greater than, and equal to, the signal from subtractor 52 when the system is above level and at level, respectively.

When the system is above level, the signal from subtractor 56 is very high, as shown in FIG. 4b. This is due primarily to the strength of the signal from source 54, which is not diminished greatly by the subtraction of the signal from amplifier 50. The signal from this amplifier is weak due to the absence of material at detector 30. When the system is below level, on the other hand, the signal from amplifier 50 is very high due to the presence of material at detector 30, and the subtraction of this signal from the signal of source 54 causes the signal from subtractor 56 to become very low, as shown in FIG. 4b. The voltage level of source 54 can be chosen such that the curve for subtractor 56 intersects that of subtractor 52 precisely when the system is at level, as shown in FIG. 4b.

The signal from subtractor 56 passes through a voltage divider network 61, consisting of resistors 62, 64, 66, and 68, and positive voltage source 70, before entering the positive terminal of the down comparator 60 and the negative terminal of the up comparator 58. The voltage divider network is used to slightly alter the output of subtractor 56 by a constant value, and its significance will be discussed in more detail below.

As mentioned above, if the signal from subtractor 56 is greater than that of subtractor 52, the down comparator 60 will be in an "on" state and will allow the system to be driven downward. This condition is satisfied, as shown in FIG. 4c, when the system is above level. Conversely, if the signal from subtractor 56 is less than that of subtractor 52, the down comparator 60 will be "off" and the up comparator 58 will "on", also shown in FIG. 4c, allowing the system to be driven upward.

However, FIG. 4c illustrates that both comparators 58, 60 are "off" over a small range, "C", of system positions. That is, the system is stationary not only at the single point adjacent the level of material in the tank, but also when the system is slightly above or below that level. If it were otherwise, minute changes in the level of material or mechanical inefficiencies in the motor and rack/pinion interface would never allow the system to become stationary. Thus, this feature is very desirable since it provides stability and preserves the life of the system's motor.

This stationary zone "C" is provided by the voltage divider network 61 referred to above, which alters the signal from subtractor 56 by a constant value, "K". Thus, referring to FIG. 3, the voltage at point A is that of subtractor 56 minus K while the voltage at point B is that of subtractor 56 plus K. In actuality, then, comparators 58, 60 are comparing the signal from subtractor 52 with the signal from subtractor 56, plus or minus the constant K.

The broken-line curves of FIG. 4b show the voltage levels of these two signals as they vary along the height of the tank. Therefore, rather than being "off" at only a single point, the comparators 58 and 60 will both be off either when the system is coming from above level, and the signal of subtractor 56 minus K is less than the signal from subtractor 52, or when, coming from below level, the signal of subtractor 56 plus K is greater than that of subtractor 52.

Figure 5:
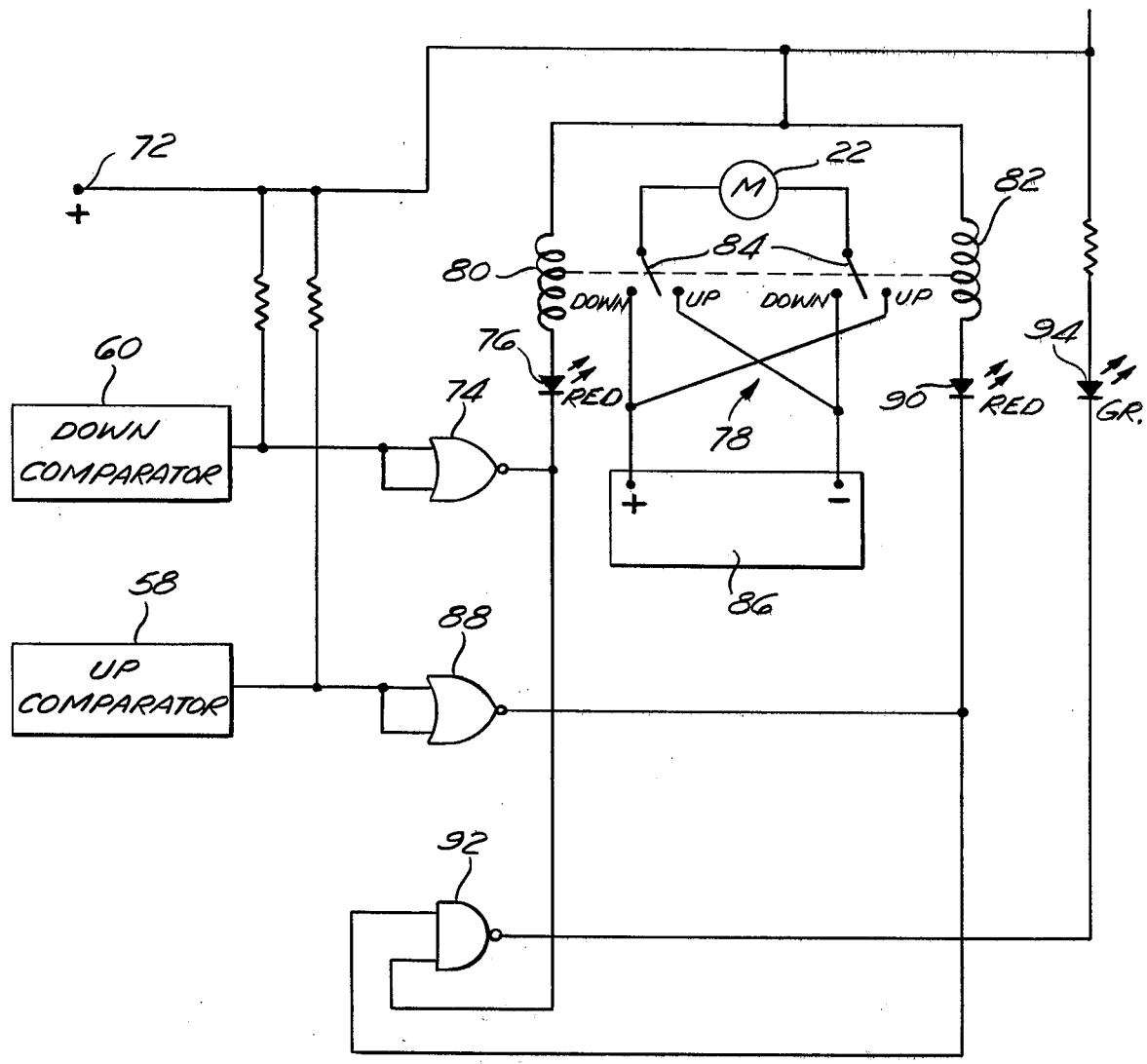
FIG. 5 is a schematic illustration of a digital logic unit connected to the electronic circuitry of FIG. 3 and used to allow the motor to drive the system up or down.

The use of the up and down comparators 58 and 60, respectively, to drive the motor 22 can be described with reference to FIG. 5. If either of these comparators "on", it will allow a positive voltage source 72 to supply a signal to the appropriate inverter 74 or 88. These inverters convert the high voltage signal from source 72 into a low voltage level which passes through a light emitting diode, 76 or 90, and into a coil, 80 or 82. The coils act in conjunction with a double pole, triple throw relay system 78 to allow voltage from source 86 to be provided to the motor 22. Switches 84 of the relay device 78, as shown in FIG. 5, are in the "rest" position which opens the circuit between power supply 86 and the motor 22.

If the down comparators 60 is "on", voltage is supplied to coil 80, switches 84 will be thrown into the "down" position, the circuit between the power supply and the motor will be closed, and the motor will drive the system downward. Similarly, if the up comparator 58 is "on", switches 84 will be thrown to the "up" position, thus reversing the direction of the current through the motor and causing the system to be driven upward. If both the up and down comparators are "off", the switches will return to the "rest" position and the system will be stationary. The signal from both inverters 74 and 88 will be high and will pass through gate 92, causing voltage source 72 to energize the light emitting diode 94.

The operation of the level detection system of the present invention can be described by reference to FIGS. 3 and 4. If the system is above level, the signal from subtractor 56, plus or minus the constant value, K, will be greater than that from subtractor 52, as shown in FIG. 4b, due to the weakness of the signal from detector 30. Therefore, the signal from source 54 will not be decreased much by the subtraction of the signal from amplifier 50. The down comparator 60 will by "on", as shown in FIG. 4c, and will allow the circuit of FIG. 5 to drive the system downward toward the level of material. The system will continue to travel downward along the vertical dimension of the tank until the signal from subtractor 56, minus the constant K, becomes less than the signal from subtractor 52, at which time the system will stop, thereby indicating the level of material in the tank.

If the system is initially below the level of material in the tank, the signal from subtractor 56, plus or minus the constant K, will be less than the signal from subtractor 52. This is due to the fact that the signal from amplifier 50 is very high, as shown in FIG. 4a, and the effect of its subtraction on source 54 is very pronounced, as shown in FIG. 4b. Thus, the up comparator 58 will be "on", as shown in FIG. 4c, and the system will travel upward until the signal from subtractor 56 plus the constant value K becomes greater than the signal from subtractor 52. The system will remain stationary in the zone designated as "C" in FIG. 4c until the level of material changes, whereupon the system will automatically travel in the appropriate direction until the level is once again relocated.

It will be recognized that the level of material in the tank can be electronically recorded in a number of ways, in addition to the visual determination of the level which is indicated by the position of the system along the tank wall. For example, the position of the system could be electronically and automatically recorded in terms of distance from the top or bottom of the tank.

Figure 6:
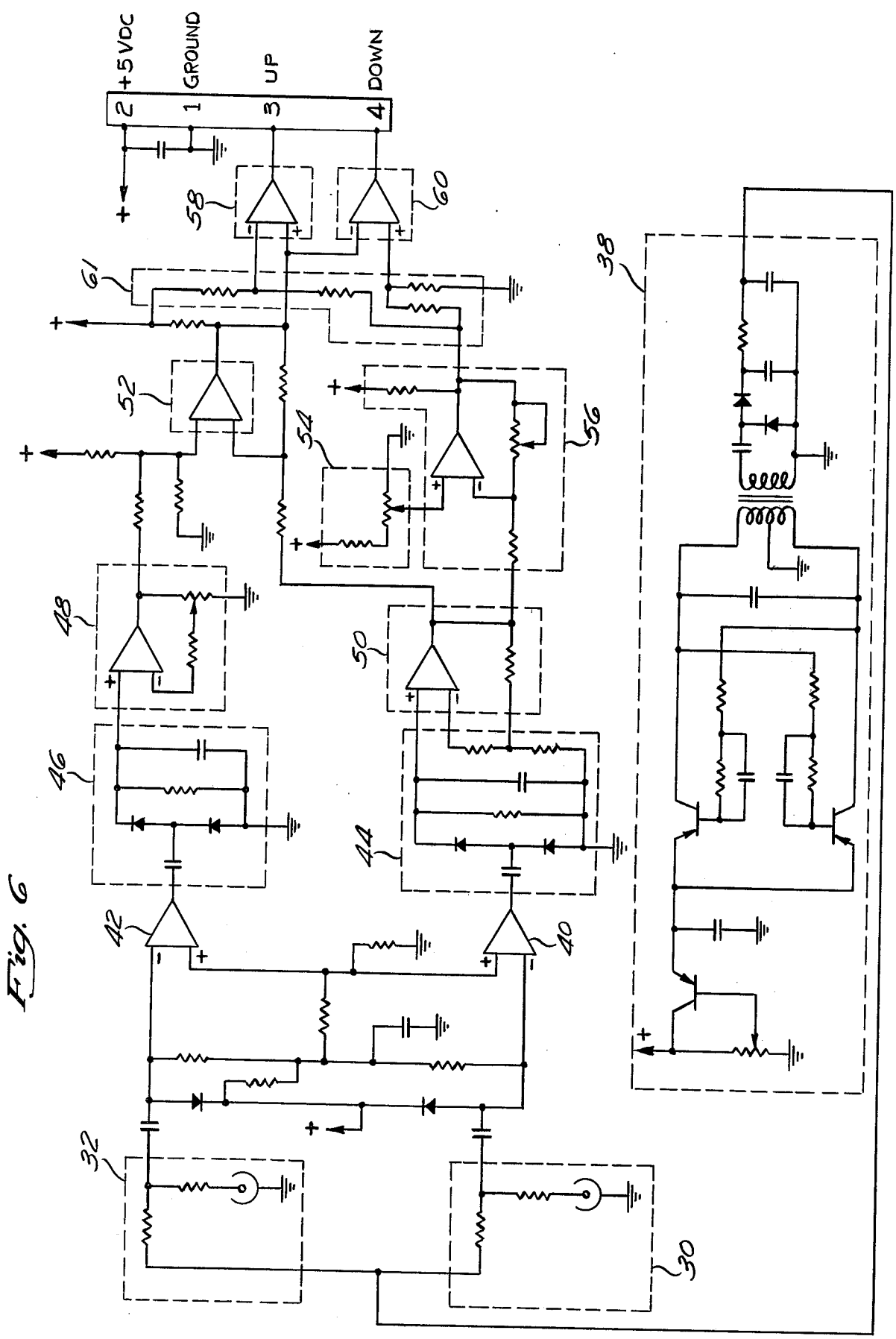
FIG. 6 is a detailed electronic circuit schematic illustrating one embodiment of the circuit of FIG. 3.

The electronic circuit of FIG. 6 illustrates one specific embodiment of the schematic circuit of FIG. 3, and the reference numerals of FIG. 6 correspond to the components of the circuit of FIG. 3.

What is claimed is:

1. A level detection device for measuring the level of material within an enclosed tank, comprising:
    a radiation source mounted on the exterior wall of said tank for emitting radiation into said tank;
    an upper radiation detector located above said source;
    a lower radiation detector located below said source, both said detectors producing electrical signals in response to back-scattered radiation;
    means for comparing said electrical signals to yield an output signal; and
    means responsive to said output signal for determining said level of material.

2. The level detection device of claim 1 wherein said source and said detectors are mounted as a unit on a track running vertically along said tank, said means responsive to said output signal driving said unit up or down along said track so that the height of said unit is indicative of the level of material within said tank.

3. The level detection device of claim 2 wherein said means responsive to said output signal permits said unit to remain stationary within a narrow range of positions adjacent the level of material within said tank.

4. A level detection device responsive to the level of material within an enclosed tank, comprising:
- a radiation source for emitting radiation into said tank;
- a first radiation detector;
- a second radiation detector positioned nearby and vertically displaced from said first radiation detector, both said detectors producing electrical signals in response to radiation from said source; and
- means for comparing said signals to produce an output signal indicative of the level of material within said tank.

5. The level detection device of claim 4 wherein said means for comparing produces an output signal which is not affected by changes in the thickness of the walls of said tank.

6. A level detection device for measuring the level of material within a tank, comprising:
- a radiation source for emitting radiation into said tank;
- means for producing an electrical signal in response to radiation from said source, said signal varying in response to changes in the level of material within said tank, and
- means within said signal responsive means for reducing changes in said electrical signal due to changes in the thickness of the walls of said tank.

7. A level detection device measuring the level of material within a tank, comprising:
- means for emitting radiation into said tank;
- means for producing an electrical signal in response to radiation from said emitting means, said signal varying in response to changes in the level of material within said tank; and
- means for eliminating changes in said electrical signal due to changes in the thickness of the walls of said tank.

8. The level detection device of claim 7 wherein said signal is used to automatically indicate the level of material within said tank.

9. A level detection device responsive to the level of material within a tank, comprising:
- means for emitting radiation into said tank;
- means for producing an electrical signal independent of changes in the thickness of the walls of said tank, said signal varying in response to backscattered radiation from said emitting means; and
- means for determining the level of material within the tank in response to said electrical signal.

10. A level detection device responsive to the level of material within a tank, wherein said device comprises:
- means for emitting radiation through said tank;
- a first means for detecting radiation from said tank;
- a second means for detecting radiation from said tank, said second detecting means positioned so that the intensity of radiation detected by said first and second detection means is substantially equal except when said level of material is between said first and second detecting means; and
- means for comparing the intensity of radiation detected by said first detecting means with the intensity of radiation detected by said second detecting means, and for generating an output signal responsive to differences in the intensity of radiation detected by said first and second detecting means.

11. The level detection device of claim 10 wherein said first and second detecting means are positioned to detect backscattered radiation.

12. The level detection device of claim 11 wherein said emitting means is mounted adjacent said first and second detecting means.

13. The level detection device of claim 12 wherein said emitting means and said first and second detecting means are vertically aligned.

14. The level detection device of claim 10 wherein said first and second detecting means are positioned symmetrically with respect to said emitting means.

15. The level detection device of claim 10 further comprising means for moving said first and second detecting means along said tank, wherein said means for moving is responsive to said output signal to thereby position said first and second detecting means so that said level of material is between said first and second detecting means.

* * * * *